United States Patent
Gschwind et al.

(10) Patent No.: US 7,925,853 B2
(45) Date of Patent: *Apr. 12, 2011

(54) METHOD AND APPARATUS FOR CONTROLLING MEMORY ARRAY GATING WHEN A PROCESSOR EXECUTES A LOW CONFIDENCE BRANCH INSTRUCTION IN AN INFORMATION HANDLING SYSTEM

(75) Inventors: Michael Karl Gschwind, Chappaqua, NY (US); Robert Alan Philhower, Valley Cottage, NY (US); Raymond Cheung Yeung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 685 days.

This patent is subject to a terminal disclaimer.

(21) Appl. No.: 11/969,344

(22) Filed: Jan. 4, 2008

(65) Prior Publication Data

US 2009/0177858 A1 Jul. 9, 2009

(51) Int. Cl.
G06F 12/00 (2006.01)
G06F 13/00 (2006.01)
G06F 13/28 (2006.01)

(52) U.S. Cl. .................. 711/163; 711/E12.001
(58) Field of Classification Search .................. 711/163, 711/E12.001
See application file for complete search history.

(56) References Cited

U.S. PATENT DOCUMENTS

| 6,272,666 B1 | 8/2001 | Borkar et al. |
| 6,363,490 B1 | 3/2002 | Senyk |
| 6,393,374 B1 | 5/2002 | Rankin et al. |

(Continued)

FOREIGN PATENT DOCUMENTS

WO PCT/US99/24194 5/2000

OTHER PUBLICATIONS

Crepps—Improving Multi-Core Architecture Power Efficiency Through EPI Throttling and Asymmetric Multiprocessing, Technology @ Intel Magazine (Feb. 2006).

(Continued)

*Primary Examiner* — Sheng-Jen Tsai
(74) *Attorney, Agent, or Firm* — Matt Talpis; Mark P Kahler

(57) ABSTRACT

An information handling system includes a processor with an array power management controller. The array power management controller gates off a memory array, such as a cache, to conserve power whenever a group of instructions in a branch instruction queue together as a group exhibits a confidence in the accuracy of branch predictions of branch instructions therein that is less than a first predetermined threshold confidence threshold. In one embodiment of the information handling system, the array power management controller speculatively inhibits the gating off of the memory array when confidence in the accuracy of a branch prediction for a particular currently issued branch instruction exhibits less than a second predetermined threshold confidence threshold. In this manner, the array power management controller again allows access to the memory array in the event a branch redirect is likely.

20 Claims, 4 Drawing Sheets

U.S. PATENT DOCUMENTS

| | | | |
|---|---|---|---|
| 6,411,156 B1 | 6/2002 | Borkar et al. | |
| 6,415,388 B1 | 7/2002 | Browning et al. | |
| 6,484,265 B2 | 11/2002 | Borkar et al. | |
| 6,564,328 B1 | 5/2003 | Grochowski et al. | |
| 6,608,528 B2 | 8/2003 | Tam et al. | |
| 6,625,744 B1 | 9/2003 | Rappoport | |
| 6,697,932 B1 | 2/2004 | Yoaz | |
| 6,762,629 B2 | 7/2004 | Tam et al. | |
| 6,788,156 B2 | 9/2004 | Tam et al. | |
| 6,908,227 B2 | 6/2005 | Rusu et al. | |
| 6,931,559 B2 | 8/2005 | Burns et al. | |
| 7,035,997 B1 | 4/2006 | Musoll et al. | |
| 7,334,143 B2* | 2/2008 | Atkinson | 713/320 |
| 7,627,742 B2* | 12/2009 | Bose et al. | 712/220 |
| 2002/0099926 A1 | 7/2002 | Sinharoy | |
| 2003/0117759 A1 | 6/2003 | Cooper | |
| 2003/0126478 A1 | 7/2003 | Burns et al. | |
| 2003/0126479 A1 | 7/2003 | Burns et al. | |
| 2003/0188211 A1 | 10/2003 | Chen | |
| 2003/0204762 A1 | 10/2003 | Lee et al. | |
| 2004/0003215 A1* | 1/2004 | Krimer et al. | 712/235 |
| 2004/0071184 A1 | 4/2004 | Naveh et al. | |
| 2004/0148528 A1 | 7/2004 | Silvester et al. | |
| 2004/0158771 A1 | 8/2004 | Garnett et al. | |
| 2005/0044434 A1 | 2/2005 | Kahle et al. | |
| 2005/0102544 A1 | 5/2005 | Brewer et al. | |
| 2005/0138438 A1 | 6/2005 | Bodas | |
| 2005/0166075 A1 | 7/2005 | Hack | |
| 2005/0235170 A1 | 10/2005 | Atkinson | |
| 2005/0283624 A1 | 12/2005 | Kumar et al. | |
| 2006/0020831 A1 | 1/2006 | Golla et al. | |
| 2006/0101238 A1 | 5/2006 | Bose | |
| 2008/0263325 A1 | 10/2008 | Kudva | |
| 2009/0150657 A1* | 6/2009 | Gschwind et al. | 712/239 |

OTHER PUBLICATIONS

Felter—A Performance-Conserving Approach for Reducing Peak Power Consumption in Server Systems, ICS'05 (Jun. 2005).

Hofstee—Power Efficient Processor Architecture and The Cell Processor, IEEE HPCA (Nov. 2005).

INTEL-1—VRM 9.0 DC-DC Converter Design Guidelines, Intel (Apr. 2002).

INTEL-2—Embedded Voltage Regulator-Down (EmVRD) 11.0, Intel Design Guidelines (Aug. 2006).

U.S. Appl. No. 11/733,589, filed Apr. 10, 2007, entitled "Method and Apparatus for Conserving Power by Throttling Instruction Fetching When a Processor Encounters Low Confidence Branches in an Information Handling System", by Bose et al.

Falcon—"A Low Complexity, High Performance Fetch Unit for Simultaneous Multithreading Processors", Proceedings of the 10th Annual International Symposium on Computer Architecture, pp. 191-202 (1996).

Grunwald—"Confidence Estimation for Speculation Control", ACM SIGARCH Computer Architecture News, vol. 26, Issue 3, pp. 122-131 (1998).

Jacobsen—"Assigning Confidence to Conditional Branch Predictions", Proceedings of the 29th Annual ACM/IEEE International Symposium on Microarchitecture; pp. 142-152 (1996).

Swanson—"An Evaluation of Speculative Instruction Execution on Simultaneous Multithreaded Processors", ACM Transactions on Computer Systems, vol. 21, No. 3, pp. 314-340 (2003).

Tullsen—"Exploiting Choice: Instruction Fetch and Issue on an Implementable Simultaneous Multithreading Processor", Proceedings of the 23rd Annual International Symposium on Computer Architecture, Philadelphia, PA, pp. 191-202 (1996).

US 6,330,680, 12/2001, Browning et al. (withdrawn)

* cited by examiner

300

METHOD AND APPARATUS FOR CONTROLLING MEMORY ARRAY GATING WHEN A PROCESSOR EXECUTES A LOW CONFIDENCE BRANCH INSTRUCTION IN AN INFORMATION HANDLING SYSTEM

TECHNICAL FIELD OF THE INVENTION

The disclosures herein relate generally to pipelined processors, and more particularly, to pipelined processors that employ power conservation methodology in information handling systems.

BACKGROUND

Modern information handling systems use processors that often generate a substantial amount of heat. Thermal throttling techniques exist that sense the temperature of the processor. When the processor's temperature exceeds a predetermined threshold temperature, the system throttles or reduces the processor's clock rate to correspondingly reduce the processor's temperature. In this manner, the system prevents undesirable overheating. Alternatively, the system may employ clock gating, i.e. stopping the processor's clock for at least a portion of the processor's logic circuits for a period of time to reduce the processor's temperature.

Power consumption is a significant contributing factor to the maximum operating frequency of modern processors. Power throttling techniques are available that sense the amount of power that a processor consumes. When the consumed power exceeds a predetermined threshold power level, a power throttling system reduces the operating frequency of the processor so that the processor consumes less power.

In particular, reducing power consumption by the front end of a pipeline processor is important because the front end typically occupies 25%-30% of the area of a modern processor. The pipeline front end often includes several memory arrays such as cache arrays, tag arrays, arrays for address translation and branch prediction arrays. These arrays consume a substantial portion of the processor's power budget.

What is needed is an apparatus and methodology that achieves further reduction in power consumption by processors in information handling systems.

SUMMARY

Accordingly, in one embodiment, a method is disclosed for operating a processor. The method includes fetching, by a fetcher, instructions from a memory array to provide an instruction stream that includes fetched branch instructions. The method includes predicting, by a branch predictor, outcomes of the fetched branch instructions, thus providing respective branch predictions for fetched branch instructions. The method also includes issuing, by an issue unit, fetched branch instructions to a branch execution unit for execution. The method further includes gating, by an array power management controller, the memory array off to conserve power if fetched branch instructions in a branch instruction queue as a group exhibit less than a first predetermined branch prediction confidence threshold, thus preventing access to the memory array. The method still further includes speculatively inhibiting, by the array power management controller, the gating off of the memory array if a particular fetched branch instruction currently issued by the issue unit exhibits less than a second predetermined branch prediction confidence threshold, thus again allowing access to the memory array.

In another embodiment, a processor is disclosed that includes a memory array that stores instructions. The processor also includes a fetcher, coupled to the memory array, that fetches instructions from the memory array to provide an instruction stream including fetched branch instructions. The processor further includes a branch predictor that predicts outcomes of the fetched branch instructions, thus providing respective branch predictions for fetched branch instructions. The processor still further includes an issue unit, coupled to the memory array and a branch execution unit, that issues fetched branch instructions to the branch execution unit for execution. The processor also includes an array power management controller, coupled to the issue unit and the memory array, that gates off the memory array to conserve power if fetched branch instructions in a branch instruction queue as a group exhibit less than a first predetermined branch prediction confidence threshold, thus preventing access to the memory array. The array power management controller inhibits the gating off of the memory array if a particular fetched branch instruction currently issued by the issue unit exhibits less than a second predetermined branch prediction confidence threshold, thus again allowing access to the memory array.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
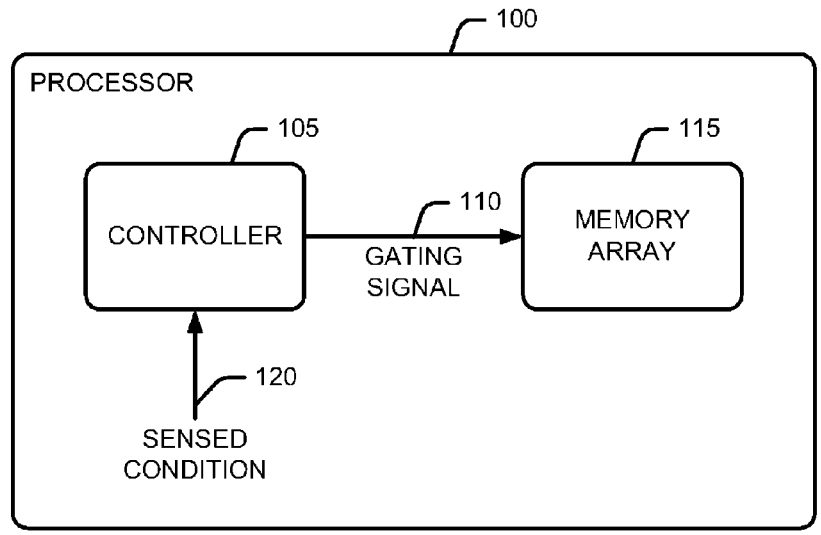
FIG. 1 shows a block diagram of a conventional processor that employs a single gating signal to gate a memory array.

FIG. 1 shows a simplified prior art clock gating design wherein a processor 100 includes a controller 105 that employs a clock gating signal 110 that turns off a memory array 115 to conserve power when processor 100 does not require access to the memory array 115. More specifically, turning off memory array 115 disables at least read operations from the array, but does not interfere with the array's ability to retain stored data. When controller 105 senses a particular sensed condition 120, for example an excessively high operating temperature, controller 105 sends a gating signal 110 that turns off memory array 115. Controller 105 may also sense other conditions, such as an excessively high amount of power consumption by processor 100. In response to sensing such an excessively high power consumption, controller 105 again sends a gating signal 110 that turns off memory array 115. Controller 105 may also determine that processor 100 does not currently need output from memory array 115. In response to determining that processor 100 does not currently need output from memory array 115, controller 105 once again sends a gating signal 110 that turns off memory array 115. In each of these cases, controller 105 turns off the entire memory array 115.

Figure 2:
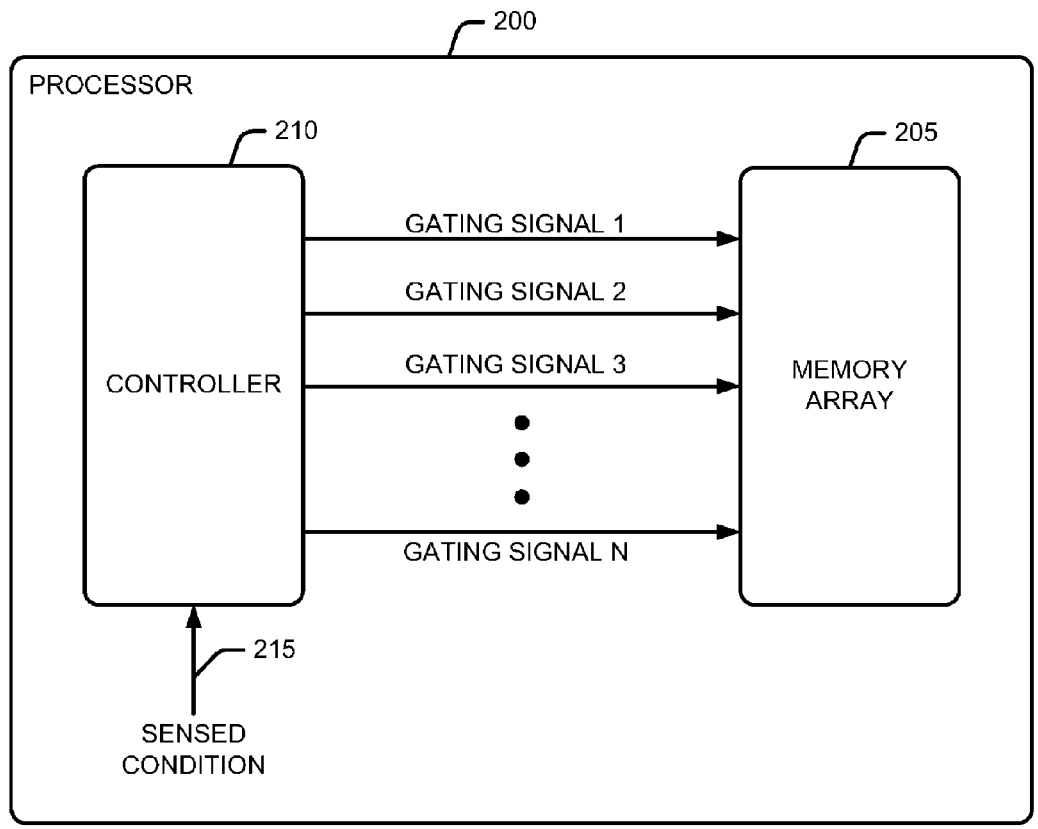
FIG. 2 shows a block diagram of a processor that employs multiple gating signals to gate different functional blocks of a memory array.

FIG. 2 shows a processor 200 that turns off or gates off one or more functional blocks of a memory array 205. Processor 200 includes multiple gating modes. Instead of a single gating signal as seen in processor 100 of FIG. 1, controller 210 generates a plurality of gating signals, namely gating signals 1, 2, 3, . . . N, that turn off respective functional blocks (not shown) in memory array 205. N represents the number of gating signals and respective functional blocks in memory array 205. These gating signals are array enable/disable signals. Controller 210 senses operating conditions 215 and in response turns off as many of the functional blocks of memory array 205 as possible. Controller 210 may base gating decisions on sensed conditions such as whether or not the processor currently needs the output of memory array 205, processor operating temperature, processor power consumption or the level of computing performance that processor 200 currently requires. More information with respect to the gating of functional blocks of memory arrays is found in U.S. patent application Ser. No. 11/620,677, filed Jan. 7, 2007, entitled "Method and Apparatus for Multiple Array Low-Power Operation Modes", by Michael Karl Gschwind and Robert Alan Philhower, the disclosure of which is incorporated herein by reference in its entirety.

Modern processors often use speculative execution techniques that employ branch prediction to increase the instruction handling efficiency of the processor. A fetch unit or instruction fetcher in the processor fetches a stream of instructions that contains branch instructions. The processor may speculatively execute instructions after a branch instruction in response to a branch prediction. Speculatively executing instructions after a branch typically involves accessing a cache memory to obtain the instructions following the branch. In more detail, after an instruction decoder decodes a fetched branch instruction of the instruction stream, a branch prediction circuit makes a prediction whether or not to take the branch that the branch instruction offers. The branch is either "taken" or "not taken". The branch prediction circuit predicts whether or not to take the branch by using branch history information, namely the branch results when the processor encountered this particular branch instruction in the past. If the branch prediction circuit predicts the branch correctly, then the processor keeps the results of instructions after the branch. However, if the branch prediction is incorrect, then the processor discards or flushes the results of instructions after the branch. The processor then starts executing instructions at a redirect address that corresponds to the correct target address of the branch instruction.

The speculative execution of instructions by a processor consumes a significant amount of power. It is desirable to minimize the power that speculative execution activities consume in a manner that does not substantially impact processor performance. One way to reduce power consumption is by throttling the fetching of instructions when the processor encounters a group of branch instructions that the processor determines to cumulatively exhibit low confidence with respect to branch prediction. The processor includes a branch instruction queue (BIQ) that stores the group of branch instructions from the instruction stream along with confidence information for each stored branch instruction. The BIQ stores those branches of the instruction stream that are "in-flight", namely those instructions that the processor did not yet resolve. If the number of low confidence branches in the BIQ is greater than a predetermined confidence threshold, then the processor performs instruction fetch throttling to reduce power consumption under these low branch prediction confidence conditions. Such a fetch throttling power conservation method is disclosed in the commonly assigned U.S. patent application Ser. No. 11/733,589, filed Apr. 10, 2007, entitled "Method and Apparatus for Conserving Power by Throttling Instruction Fetching When a Processor Encounters Low Confidence Branches in an Information Handling System", by Bose et al, the disclosure of which is incorporated herein by reference in its entirety. While saving power, this methodology does exhibit some negative impact on processor performance. It is desirable to achieve such power saving with less negative impact on processor performance.

Figure 3:
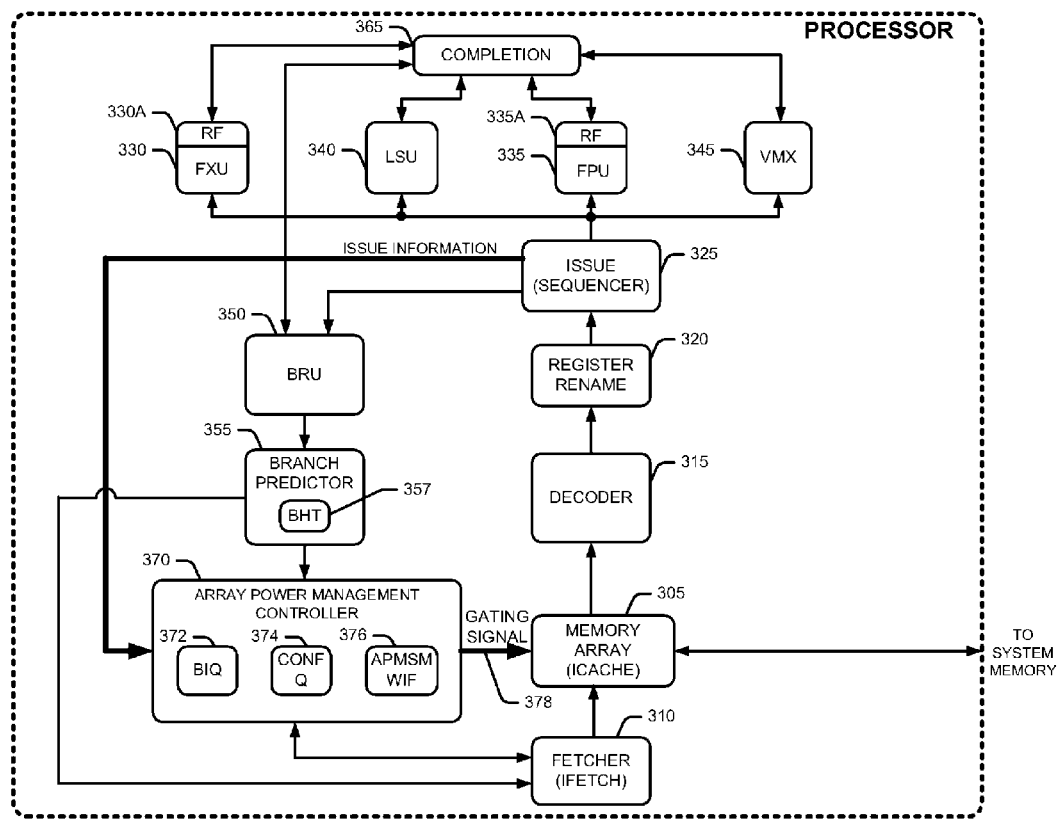
FIG. 3 shows a block diagram of the disclosed processor.

FIG. 3 shows an embodiment of the disclosed processor 300 that reduces power consumption via another power saving methodology. Processor 300 gates off or disables a memory array 305 in the processor when the processor does not require access to that memory array. More particularly, processor 300 gates off memory array 305 when it encounters a group of low confidence branch instructions. If a group of branch instructions in a branch instruction queue (BIQ) 372 cumulatively exhibits less than a first predetermined amount of low branch prediction confidence, then processor 300 speculatively gates off the memory array 305. This saves power that the memory array 305 would otherwise consume. However, if a particular instruction in the group of branch instructions in the branch instruction queue 372 exhibits less than a second predetermined amount of low branch prediction confidence, such that a redirect for that particular branch instruction is likely, then processor 300 inhibits gating (i.e. re-enables) the memory array 305. In this manner, the memory array 305 is ready for access if a branch redirect occurs.

As discussed above, the disclosed power saving methodology conserves power by gating off a memory array during the processing of groups of low confidence branches. While array gating methodology does conserve power, it has a measurable negative impact on processor performance in terms of increased fetch latency should a branch redirect occur for a speculatively executed branch. It is desirable to reduce this negative impact on processor performance while still achieving power saving when gating a memory array.

Under some circumstances it is possible to inhibit array gating to increase processor performance without unduly impacting power conservation. For example, if a particular currently issued branch instruction from the fetched instruction stream exhibits low confidence of prediction, the processor 300 may inhibit array gating after commencing array gating because a group of branch instructions in BIQ 372 exhibits low confidence of prediction.

In one embodiment, processor 300 is a simultaneous multithreading (SMT) processor that includes multiple pipeline stages. Processor 300 includes a fetcher 310 that couples via memory array 305, for example an instruction cache (ICACHE), to an external system memory (not shown). Memory array 305 couples to a decoder 315 that decodes fetched instructions from memory array 305. Decoder 315 couples to an issue unit or sequencer 325 via register renaming circuit 320. Register renaming circuit 320 effectively provides additional registers to enhance the execution of fetched instructions. Issue unit or sequencer 325 sends decoded instructions to appropriate functional units for execution. Processor 300 includes the following functional units: an integer or fixed point execution unit (FXU) 330, a floating-point execution unit (FPU) 335, a load/store execution unit (LSU) 340, a vector media extension execution unit (VMX) 345 and a branch execution unit (BRU) 350. FXU 330 and FPU 335 include register files 330A and 335A, respectively, for storing computational results.

Branch execution unit (BRU) 350 couples to issue unit or sequencer 325 to execute branch instructions that it receives from sequencer 325. BRU 350 also couples to both completion unit 365 and branch predictor 355. The execution units FXU 330, LSU 340, FPU 335, VMX 345 and BRU 350 speculatively execute instructions in the instruction stream after a decoded branch instruction. Branch predictor 355 includes a branch history table (BHT) 357. Branch history table (BHT) 357 tracks the historical outcome of previously executed branch instructions. Branch predictor 355 uses this historical branch execution information to make branch predictions for branch instructions that it currently receives. Instruction fetcher 310 couples to branch predictor 355 to obtain a branch prediction when fetcher 310 encounters a branch instruction in the fetched instruction stream and to compute a next fetch address based on the branch prediction.

A completion unit 365 couples to each of the execution units, namely FXU 330, FPU 335, LSU 340, VMX 345 and BRU 350. More specifically, completion unit 365 couples to FXU register file 330A and FPU register file 335A. Completion unit 365 determines whether or not speculatively executed instructions should complete. If the branch predictor 355 correctly predicts a branch, then the instructions following the branch should complete. For example, if branch predictor 355 correctly predicts a branch, then a fixed point or integer instruction following that branch should complete. If the instruction following the correctly predicted branch is a fixed point instruction, then completion unit 365 controls the write back of the fixed point result of the branch to fixed point register file 330A. If the instruction following the correctly predicted branch is a floating point instruction, then completion unit 365 controls the write back of the result of that floating point instruction to floating point register file 335A. When instructions complete, they are no longer speculative. The branch execution unit (BRU) 350 operates in cooperation with completion unit 365 and BHT 357 to resolve whether or not branch predictor 355 correctly predicted the outcome of a branch instruction. When branch predictor 355 does not correctly predict a branch, branch unit 350 causes the instruction issue unit 325 to flush all instructions following the mispredicted branch. Branch unit 350 also directs completion stage 365 to invalidate all instructions after the mispredicted branch. Branch unit 350 further directs instruction fetcher 310 to conduct a branch redirect in the event of a mispredicted branch. In response, instruction fetcher 310 starts fetching at the address of the instruction that should execute after the mispredicted branch, i.e. either from the next sequential address following the branch or from the target address of the branch.

Processor 300 of FIG. 3 includes an array power management controller 370 that controls when processor 300 engages in array gating and when processor 300 inhibits array gating. More particularly, in one exemplary embodiment, array power management controller 370 includes a branch instruction queue (BIQ) 372 and a confidence queue (CONF Q) 374. Array power management controller 370 also includes an array power management state machine with inhibit function (APMSMWIF) 376 that controls the gating of memory array 305. Branch instruction queue (BIQ) 372 stores branch instructions that it receives from fetcher 310 to which it couples. For each branch instruction in BIQ 372, confidence queue 374 stores respective confidence information that indicates the level of confidence in the prediction of that branch which branch predictor 355 provides. BIQ 372 may include both valid and invalid branch instructions. The invalid branch instructions are those speculatively executed branch instructions that completion unit 365 resolved previously but which still remain in BIQ 372. The remaining valid branch instructions in BIQ 372 are those branch instructions still "in flight", namely those speculatively executed branch instructions that completion unit 365 did not yet resolve.

Array power management controller 370 includes the array power management state machine with inhibit function (APMSMWIF) 376 that, under certain predetermined conditions, commands memory array 305 to commence array gating of instructions and/or data from memory array 305 to conserve power. If the valid branch instructions in BIQ 372 taken together cumulatively exhibit less than a first predetermined amount of confidence of branch prediction, then APMSMWIF 376 may instruct the commencement of array gating to save power. However, once such array gating commences, should a particular currently issued branch instruction in BIQ 372 exhibit less than a second predetermined amount of confidence, then APMSMWIF 376 inhibits array gating for a predetermined relatively short window of time.

In one embodiment, APMSMWIF 376 conducts first and second tests to perform the above confidence determinations. More specifically, APMSMWIF 376 performs a first test to determine if the valid branch instructions in BIQ 372 taken together cumulatively exhibit less than a first predetermined amount of confidence threshold. If the valid branch instructions in BIQ 372 taken together cumulatively do exhibit less confidence than the first predetermined amount of confidence, then APMSMWIF 376 may instruct the commencement of array gating by transmitting an array gating signal 378. After APMSMWIF 376 commences array gating, APMSMWIF 376 conducts a second test on a particular currently issued branch instruction in BIQ 372 to determine if that particular currently issued branch instruction exhibits less than a second predetermined amount of confidence. If the second test finds that the particular currently issued branch instruction does exhibit less than a second predetermined amount of confidence, then APMSMWIF 376 may instruct the inhibiting of array gating to increase performance in the likely event of a branch redirect.

In one embodiment, the designer bases the confidence in a branch prediction that the second test employs on a confidence value derived at branch instruction prediction time and corresponding to the value that the confidence queue 374 stores for that branch. In another embodiment, APMSMWIF 376 obtains this confidence information from other instruction characteristics, such as the nature of a specific branch. For example, indirect branches or PC-relative condition forward branches are usable to infer low confidence. In contrast, unconditional branch instructions, return from subrouting branch instructions (e.g. the branch to link register (blr) instruction in the Power Architecture™), and backward PC-relative conditional branch instructions are usable to infer high confidence.

In one embodiment, processor 300 may store the confidence information for the second confidence test in at least one of a branch instruction queue (BIQ) 372 or a confidence queue (CONF Q) 374. In another embodiment, processor 300 may store this confidence information directly with the branch in a branch issue queue (not shown) that stores both branch instructions and respective confidence information. Such an embodiment reduces the additional latency of performing a read operation via a separate branch instruction queue and confidence queue.

Different embodiments of the disclosed processor 300 may employ different time values or settings for the predetermined time window during which the processor inhibits array gating. In one embodiment, processor 300 inhibits array gating for exactly one cycle that corresponds to the cycle for which the current branch instruction, on behalf of which the processor inhibits array gating, may cause the first fetch corresponding to a redirect. In another embodiment, processor 300 may employ multiple cycles of array gating including a first redirect cycle, i.e. the first fetch responsive to the redirect corresponding to the inhibiting branch, and further including a second cycle corresponding to the next fetch cycle corresponding to a fetch following the first fetch redirect cycle. One embodiment of the processor may determine the specific time window setting for the second test at hardware design time. In another embodiment, this time window is programmable by a power management tool, firmware, a hypervisor, an operating system, or an application.

Array power management controller 370 of FIG. 3 gates or turns off memory array 305 when the cumulative confidence in the predictions of valid branches in branch instruction queue (BIQ) 372 is less than a first predetermined confidence level. In other words, array power management controller 370 commences array gating when the confidence bits in CONF Q 374 associated with valid branch instructions in BIQ 372 together represent a cumulative confidence level that is less than a first predetermined confidence level. This first confidence test is thus a "cumulative confidence test" in that it considers the aggregated confidence of multiple valid branch instructions as a group in BIQ 372. The disclosed processor may use an array power management controller that employs structures and mechanisms other than branch instruction queues and confidence queues to determine a cumulative level of confidence in the first cumulative confidence test.

Array power management controller 370 also conducts a second confidence test, namely a confidence test on each branch instruction that issue unit or sequencer 325 currently selects for issue. This is an "individual confidence test" in that array power management controller 370 performs this test on each branch instruction that issue unit or unit 325 selects for issue. This test determines if the particular branch instruction exhibits less than a second predetermined confidence level. If the particular branch instruction exhibits less than the second predetermined confidence level, then array power management controller 370 may inhibit, suppress or override array gating for a predetermined period of time. In other words, under these conditions array power management controller 370 re-enables memory array access without respect to the array gating indication derived in the first cumulative confidence test for a predetermined period of time to increase processor performance. In one embodiment, to inhibit array gating, array power management controller 370 instructs memory array 305 to again turn memory array 305 back on to recommence memory array access. By re-enabling memory array access at the point of issue in this manner, branch unit (BRU) 350 generates a redirect address just in time for use by fetcher 310. With memory array 305 turned back on, memory array 305 is ready to service the redirect. This may result in a significant processor performance increase. After this predetermined period of time or window expires, array power management controller 370 may again commence array gating of the memory array off if the first cumulative confidence test indicates that the valid branch instructions in BIQ 370 as a group exhibit a cumulative level of confidence less that the first predetermined confidence level. In one embodiment, the inhibiting of array gating is speculative in the sense that the fetch throttle controller 370 conducts array gating inhibiting in anticipation that a branch redirect is likely when a particular branch instruction exhibits less confidence than the second predetermined confidence level.

Inhibiting array gating includes overriding, terminating and halting array gating. Gating an array off may include different types of gating such as clock gating of the memory array and output gating of the memory array. In one embodiment, gating a memory array off means effectively turning the memory array off or otherwise disabling the memory array to conserve power. In alternative embodiments, memory arrays 305 that processor 300 may gate off or inhibit such gating off include instruction caches, data caches, translation lookaside buffers (TLBs) and Effective to Real Address Translation (ERAT) arrays, for example.

In the embodiment shown in FIG. 3, array power management controller 370 generates a single gating signal 378 that may gate off or on the entire memory array 305. In an alternative embodiment, memory array 305 may include multiple functional blocks and array power management controller 370 may generate multiple gating signals to gate off or on respective functional blocks of memory array 305.

Figure 4:
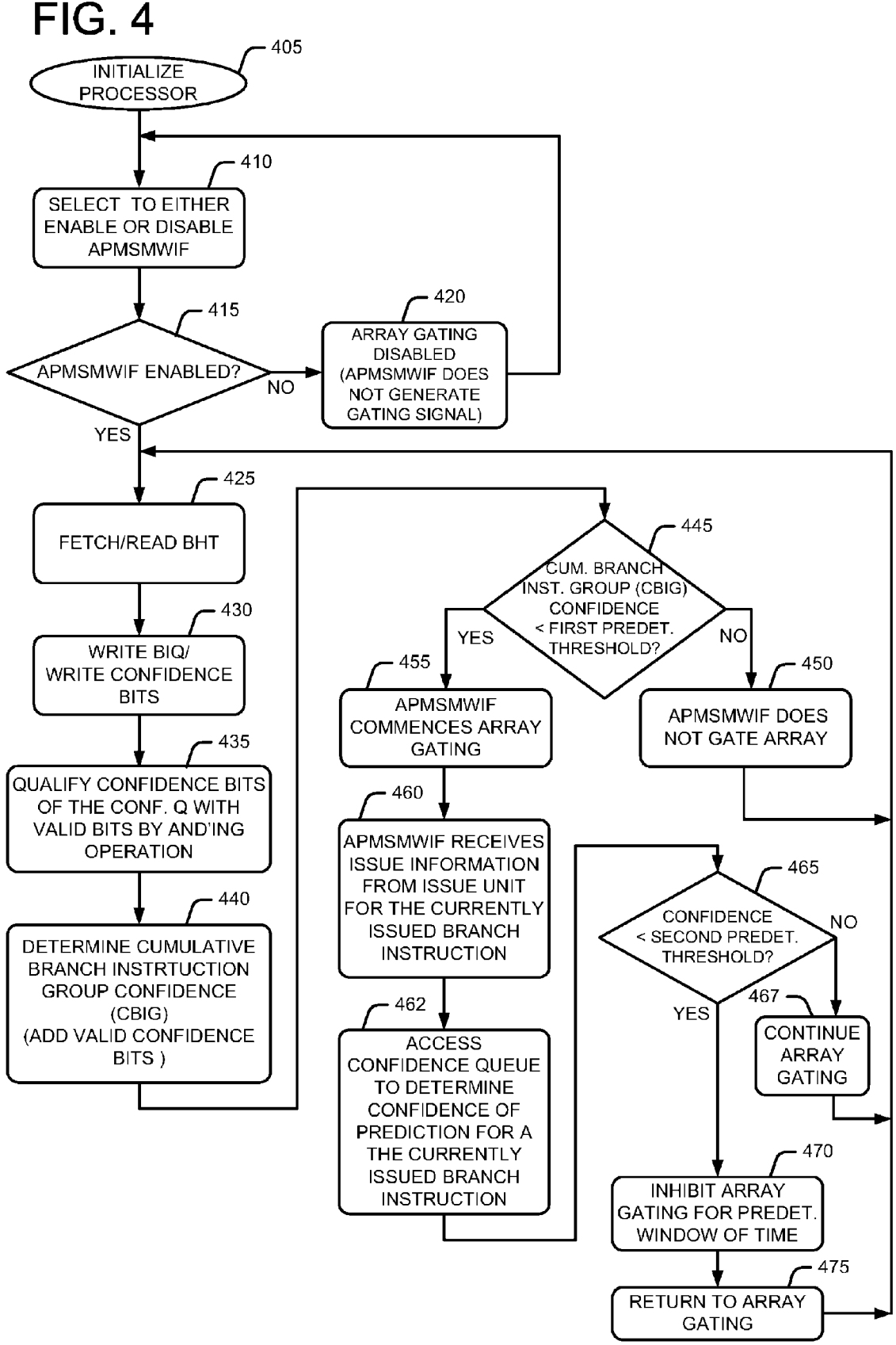
FIG. 4 is a flowchart that shows process flow in the processor of FIG. 3 as it conducts array gating operations.

FIG. 4 is a flowchart that shows one embodiment of the array gating inhibit methodology that processor 300 employs to increase processor performance while still conserving power. Array power management state machine with inhibit function (APMSMWIF) 376 generates a gating signal 378 that controls both the gating of memory array 305 and the inhibiting of the gating of memory array 305. Process flow commences when the processor 300 initializes, as per initialize processor block 405. A processor designer, user or other entity either enables or disables the APMSMWIF 376 by providing an appropriate input selection to APMSMWIF 376, as per block 410. APMSMWIF 376 performs a test to determine if APMSMWIF 376 exhibits the enabled state, as per decision block 415. If APMSMWIF 376 does not exhibit the enabled state, then APMSMWIF 376 disables array gating, i.e. APMSMWIF 376 does not generate a gating signal 378 for memory array 305, as per block 420. However, if APMSMWIF 376 exhibits the enabled state, then array gating may commence under appropriate conditions.

If APMSMWIF 376 exhibits the enabled state, then fetcher 310 fetches instructions and the array power management controller 370 reads branch history table (BHT) 357 of branch predictor 355 to observe branch predictions for fetched branch instructions in the fetched instruction stream, as per block 425. Fetcher 310 supplies branch instructions for the fetched instruction stream to branch instruction queue (BIQ) 372. BIQ 372 writes those fetched branch instructions as entries of the BIQ, as per block 430. BIQ 372 thus stores a group of branch instructions that includes those branch instructions in the instruction stream that are currently "in flight" or not yet resolved. Such "in flight" branch instructions are valid branch instructions. BIQ 372 may also include some old resolved branch instructions that array power management controller 370 treats as being invalid branch instructions. Confidence queue 374 stores confidence information such as a confidence bit for each branch instruction entry of BIQ 372, also as per block 430. A confidence bit of 1 indicates high confidence in the branch prediction that branch predictor 355 makes for a respective branch instruction. A confidence bit of 0 indicates low confidence in the branch prediction that branch predictor 355 makes for a respective branch instruction.

APMSMWIF 370 qualifies the confidence bits in confidence queue 374 by ANDing the confidence bits with respective valid bits in one embodiment, as per block 435. Array power management state machine (APMSMWIF) 376 determines a cumulative branch instruction group (CBIG) confidence level for the valid branch instructions in BIQ 372, as per block 440. In one embodiment, APMSMWIF 376 adds together the confidence bits or confidence information in confidence queue 374 for the respective valid branch instructions of BIQ 372, thus forming the cumulative branch instruction group (CBIG) confidence level. The CBIG confidence level indicates an amount of confidence in the branch predictions for the valid branch instructions that BIQ 372 currently stores. This confidence level varies as the branch instructions that BIQ 372 stores change when the processor executes instructions of the instruction stream. Those skilled in the art may adjust or modify the disclosed array power management inhibit methodology of FIG. 4 to work in conjunction with other methods for determining a first cumulative branch instruction group (CBIG) confidence level by adapting and/or replacing one or more of steps 430, 435 and 440 of FIG. 4.

APMSMWIF 376 performs a first test to determine if the current cumulative branch instruction group (CBIG) confidence level is less than a first predetermined confidence threshold, as per decision block 445. If so, this indicates overall low confidence in the branch predictions for the valid branch instructions in branch instruction queue (BIQ) 372. In one embodiment, the designer or other entity selects the first predetermined confidence threshold such that if the current CBIG confidence level is less than the first predetermined confidence threshold, then a branch misprediction is more likely than not for branches in BIQ 372. If the test of decision block 445 determines that the CBIG confidence level is not less than the first predetermined confidence threshold, then array power management controller 370 does not commence memory array gating of the array off, as per block 450. The APMSMWIF 376 generates a gating signal 378 that instructs memory array 305 not to gate that array off. Process flow continues back to block 425 and instruction fetching continues, as per block 425.

However, if the test of decision block 445 determines that the CBIG confidence level is currently less than the first predetermined confidence threshold, then array power management controller 370 commences array gating to reduce processor power consumption by effectively turning memory array 305 off, as per block 455. More specifically, APMSMWIF 376 activates array gating by generating a gating signal 378 that instructs memory array 305 to gate off to conserve power. In response, such array gating commences to save power when overall branch prediction confidence is low for the group of valid branch instructions in BIQ 372.

In one embodiment, once such array gating commences, APMSMWIF 376 receives issue information from issue unit 325 that informs APMSMWIF 376 when issue unit 325 issues each branch instruction in BIQ 372, as per block 460. The issue information includes branch issue information that informs APMSMWIF 376 that issue unit 325 sent the currently issued branch instruction to BRU 350 for execution. APMSMWIF 376 checks the respective confidence in confidence queue 374 of the currently issued branch instruction when issue unit 325 issues that branch instruction, as per block 462. In alternative embodiments, APMSMWIF 376 may employ other ways to establish the confidence associated with a respective issued branch instruction. APMSMWIF 376 then conducts a second test to determine if the confidence in the branch prediction for the particular currently issued branch instruction in BIQ 372 is less than a second predetermined confidence threshold, as per decision block 465.

In one embodiment, processor 200 bases confidence in a branch prediction analyzed in the second test on a confidence value that array power management controller 370 derives at branch instruction prediction time and corresponding to the confidence value that the confidence queue stores. The processor may derive this confidence information from instruction characteristics, such as the nature of a particular branch instruction. For example, the processor may infer low confidence for indirect branches instructions or PC-relative condition foreword branch instructions, whereas the processor may infer high confidence for unconditional branch instructions, return from subrouting branch instructions (branch to link register blr instruction in the Power Architecture™), and backward PC-relative conditional branch instructions. One embodiment of the processor stores confidence information for the second test in at least one confidence queue. For example, to use the confidence information, array power management controller 370 retrieves confidence information from confidence queue 374. In another embodiment, the processor stores confidence information for the second test, directly with the respective branch instruction in the branch issue queue (BIQ) to reduce the additional latency of performing a read operation from the BIQ or CONF Q.

If the confidence in the prediction for the particular currently issued branch instruction is not less than the second predetermined threshold for the second test at decision block 465, then APMSMWIF 376 instructs memory array 305 to continue array gating, as per block 467. In other words, memory array 305 remains gated off. Note that, under this test, such array gating will occur in the case where the particular currently issued branch instruction is an unconditional branch instruction that by definition exhibits high confidence or certainty of prediction. In that case process flow continues back to fetch block 425. However, if the confidence in the prediction for the particular currently issued branch instruction is less than the second predetermined threshold, then APMSMWIF 376 inhibits array gating for a time window of predetermined duration, as per block 470. In one embodiment, this array gating inhibit time window exhibits a relatively short duration during which controller 370 turns back on or re-enables memory array 305. Different embodiments of the processor may employ time windows of different durations during which array power management controller 370 inhibits array gating. In one embodiment, array power management controller 370 inhibits array gating for exactly one cycle corresponding to the cycle when the current branch, on behalf of which array gating is inhibited, may cause the first fetch corresponding to a branch redirect. In another embodiment, the processor may inhibit array gating for multiple cycles, including the first redirect cycle, i.e. the first fetch responsive to the redirect corresponding to the inhibiting branch, and further including a second cycle corresponding to the next fetch cycle corresponding to a fetch following the first fetch cycle.

After expiration of this array gating inhibit time window, APMSMWIF 376 stops inhibiting or suppressing array gating such that array gating commences again, as per block 475. The memory array 305 may thus turn back off to conserve power. Process flow continues back to fetch block 425. When the cumulative branch instruction group (CBIG) confidence level is no longer less than the first predetermined threshold at decision block 445, then array gating ceases and fetching from memory array 305 re-commences.

In the embodiment above, APMSMWIF 376 monitors the cumulative branch instruction group (CBIG) confidence level for a group of branch instructions to determine if that confidence level is sufficiently low to merit array gating to save power. In an equivalent embodiment, it is also possible for APMSMWIF 376 to monitor a cumulative branch lack of confidence level in the predictions for a group of branch instructions to determine if that lack of confidence is sufficiently high to merit array gating. APMSMWIF 376 may use either of these two equivalent conditions to trigger array gating.

In one embodiment, in response to the second test finding that a particular currently issued branch instruction exhibits less branch prediction confidence than the second predetermined confidence threshold, array power management controller 370 again allows array gating starting at a time the particular branch would direct the fetcher 310 to fetch from a new location in memory, and possibly one or more cycles thereafter. In other words, APMSMWIF 376 speculatively disables array gating whenever issue unit 325 selects a low confidence branch instruction for issue. By re-enabling array gating at this point in time, the branch unit 350 generates a redirect address just in time for use by fetcher 310. Disabling array gating is equivalent to re-enabling access to memory array 305 or turning memory array 305 back on.

Array gating inhibition is now summarized for the embodiment wherein APMSMWIF 376 monitors the cumulative branch instruction group (CBIG) confidence level for a group of branch instructions to determine if that confidence level is sufficiently low to merit array gating, namely less than a first predetermined threshold. In that embodiment, APMSMWIF 376 inhibits array gating when a particular currently issued branch instruction exhibits less confidence than a second predetermined threshold, as per block 465 of the FIG. 4 flowchart.

Array gating inhibition is now summarized for the embodiment wherein APMSMWIF 376 monitors a cumulative branch instruction group (CBIG) lack of confidence level for a group of branch instructions to determine if that lack of confidence level is sufficiently high to merit array gating, namely more than a first predetermined lack of confidence threshold. In that embodiment, APMSMWIF 376 inhibits array gating when a particular currently issued branch instruction exhibits more lack of confidence than a second predetermined lack of confidence threshold. In other words, APMSMWIF 376 replaces decision block 465 of the FIG. 4 flowchart with a test to determine when a particular currently issued branch instruction exhibits more lack of confidence in its branch prediction than the second predetermined lack of confidence threshold.

In one embodiment, the threshold for the second individual confidence test 465 is selectable in a manner such that any issue branch instruction causes the inhibition of array gating. In another embodiment, a processor may maintain separate confidence values for different threads provided the processor supports hardware multi-threading.

Figure 5:
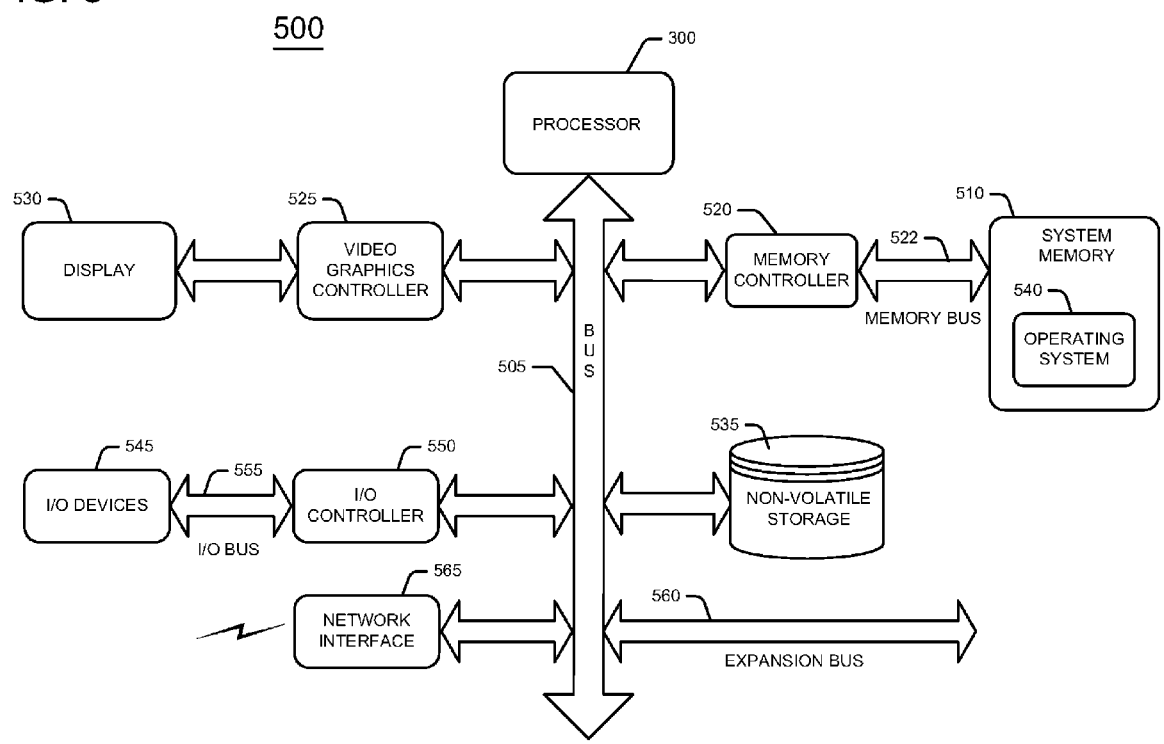
FIG. 5 is block diagram of an information handling system (IHS) that employs the processor of FIG. 3 and the methodology of FIG. 4.

FIG. 5 shows an information handling system (IHS) 500 that employs processor 300. An IHS is a system that processes, transfers, communicates, modifies, stores or otherwise handles information in digital form, analog form or other form. IHS 500 includes a bus 505 that couples processor 300 to system memory 510 via a memory controller 520 and memory bus 522. A video graphics controller 525 couples display 530 to bus 505. Nonvolatile storage 535, such as a hard disk drive, CD drive, DVD drive, or other nonvolatile storage couples to bus 505 to provide IHS 500 with permanent storage of information. An operating system 540 loads in memory 510 to govern the operation of IHS 500. I/O devices 545, such as a keyboard and a mouse pointing device, couple to bus 505 via I/O controller 550 and I/O bus 555. One or more expansion busses 560, such as USB, IEEE 1394 bus, ATA, SATA, PCI, PCIE and other busses, couple to bus 505 to facilitate the connection of peripherals and devices to IHS 500. A network adapter 565 couples to bus 505 to enable IHS 500 to connect by wire or wirelessly to a network and other information handling systems. While FIG. 5 shows one IHS that employs processor 300, the IHS may take many forms. For example, IHS 500 may take the form of a desktop, server, portable, laptop, notebook, or other form factor computer or data processing system. IHS 500 may take other form factors such as a gaming device, a personal digital assistant (PDA), a portable telephone device, a communication device or other devices that include a processor and memory.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of operating a processor, the method comprising:
    fetching, by a fetcher, instructions from a memory array to provide an instruction stream that includes fetched branch instructions;
    predicting, by a branch predictor, outcomes of the fetched branch instructions, thus providing respective branch predictions for fetched branch instructions;
    issuing, by an issue unit, fetched branch instructions to a branch execution unit for execution;
    gating, by an array power management controller, the memory array off to conserve power if fetched branch instructions in a branch instruction queue as a group exhibit less than a first predetermined branch prediction confidence threshold, thus preventing access to the memory array; and
    inhibiting, by the array power management controller, the gating off of the memory array if a particular fetched branch instruction currently issued by the issue unit exhibits less than a second predetermined branch prediction confidence threshold, thus again allowing access to the memory array.

2. The method of claim 1, wherein the gating step includes performing, by the array power management controller, a first test to determine if fetched branch instructions as a group in the branch instruction queue cumulatively exhibit less than the first predetermined branch prediction confidence threshold.

3. The method of claim 2, wherein the inhibiting step includes performing, by the array power management controller, a second test to determine if the particular fetched branch instruction currently issued by the issue unit exhibits less than the second predetermined branch prediction confidence threshold.

4. The method of claim 2, wherein the first test is conducted by the array power management controller on in-flight branch instructions within the branch issue queue.

5. The method of claim 1, wherein the inhibiting step further comprises gating the memory array off if the particular fetched branch instruction currently issued by the issue unit is an unconditional branch instruction that exhibits certainty of branch prediction.

6. The method of claim 1, wherein the inhibiting step includes inhibiting, by the array power management controller, the gating off of the memory array for a window of predetermined time duration.

7. The method of claim 6, further comprising returning to gating off, by the array power management controller, the memory array after expiration of the window of predetermined time duration.

8. A processor comprising:

a memory array that stores instructions;

a fetcher, coupled to the memory array, that fetches instructions from the memory array to provide an instruction stream including fetched branch instructions;

a branch predictor that predicts outcomes of the fetched branch instructions, thus providing respective branch predictions for fetched branch instructions;

an issue unit, coupled to the memory array and a branch execution unit, that issues fetched branch instructions to the branch execution unit for execution; and an array power management controller, coupled to the issue unit and the memory array, that gates off the memory array to conserve power if fetched branch instructions in a branch instruction queue as a group exhibit less than a first predetermined branch prediction confidence threshold, thus preventing access to the memory array, the array power management controller inhibiting the gating off of the memory array if a particular fetched branch instruction currently issued by the issue unit exhibits less than a second predetermined branch prediction confidence threshold, thus again allowing access to the memory array.

9. The processor of claim 8, wherein the array power management controller performs a first test to determine if fetched branch instructions as a group in the branch instruction queue cumulatively exhibit less than the first predetermined branch prediction confidence threshold.

10. The processor of claim 9, wherein prior to inhibiting the gating off of the memory array, the array power management controller performs a second test to determine if the particular fetched branch instruction currently issued by the issue unit exhibits less than the second predetermined branch prediction confidence threshold.

11. The processor of claim 9, wherein the array power management controller conducts the first test on in-flight branch instructions within the branch issue queue.

12. The processor of claim 8, wherein the array power management controller is configured to gate the memory array off if the particular fetched branch instruction currently issued by the issue unit is an unconditional branch instruction that exhibits certainty of branch prediction.

13. The processor of claim 8, wherein the array power management controller is configured to inhibit the gating off of the memory array for a window of predetermined time duration if a particular fetched branch instruction currently issued by the issue unit exhibits less than the second predetermined branch prediction confidence threshold, thus again allowing access to the memory array.

14. The processor of claim 13, wherein the array power management controller is configured to return to gating off the memory array after expiration of the window of predetermined time duration.

15. An information handling system (IHS) comprising:

a system memory;

a processor coupled to the system memory, the processor including:

a memory array that stores instructions;

a fetcher, coupled to the memory array, that fetches instructions from the memory array to provide an instruction stream including fetched branch instructions;

a branch predictor that predicts outcomes of the fetched branch instructions, thus providing respective branch predictions for fetched branch instructions;

an issue unit, coupled to the memory array and a branch execution unit, that issues fetched branch instructions to the branch execution unit for execution; and an array power management controller, coupled to the issue unit and the memory array, that gates off the memory array to conserve power if fetched branch instructions in a branch instruction queue as a group exhibit less than a first predetermined branch prediction confidence threshold, thus preventing access to the memory array, the array power management controller inhibiting the gating off of the memory array if a particular fetched branch instruction currently issued by the issue unit exhibits less than a second predetermined branch prediction confidence threshold, thus again allowing access to the memory array.

16. The IHS of claim 15, wherein the array power management controller performs a first test to determine if fetched branch instructions as a group in the branch instruction queue cumulatively exhibit less than the first predetermined branch prediction confidence threshold.

17. The IHS of claim 16, wherein prior to inhibiting the gating off of the memory array, the array power management controller performs a second test to determine if the particular fetched branch instruction currently issued by the issue unit exhibits less than the second predetermined branch prediction confidence threshold.

18. The IHS of claim 16, wherein the array power management controller conducts the first test on in-flight branch instructions within the branch issue queue.

19. The IHS of claim 15, wherein the array power management controller is configured to gate the memory array off if the particular fetched branch instruction currently issued by the issue unit is an unconditional branch instruction that exhibits certainty of branch prediction.

20. The IHS of claim 19, wherein the array power management controller is configured to inhibit the gating off of the memory array for a window of predetermined time duration if a particular fetched branch instruction currently issued by the issue unit exhibits less than the second predetermined branch prediction confidence threshold, thus again allowing access to the memory array.

* * * * *